(12) United States Patent
Van Horn et al.

(10) Patent No.: US 8,703,690 B2
(45) Date of Patent: Apr. 22, 2014

(54) USE OF R-1233 IN LIQUID CHILLERS

(75) Inventors: Brett L. Van Horn, King of Prussia, PA (US); Phillipe Bonnet, Lower Merion, PA (US)

(73) Assignee: Arkema Inc., King of Prussia, PA (US)

( * ) Notice: Subject to any disclaimer, the term of this patent is extended or adjusted under 35 U.S.C. 154(b) by 646 days.

(21) Appl. No.: 12/667,136

(22) PCT Filed: Mar. 6, 2009

(86) PCT No.: PCT/US2009/036268
§ 371 (c)(1),
(2), (4) Date: Dec. 29, 2009

(87) PCT Pub. No.: WO2009/114398
PCT Pub. Date: Sep. 17, 2009

(65) Prior Publication Data
US 2010/0326095 A1 Dec. 30, 2010

Related U.S. Application Data

(60) Provisional application No. 61/034,513, filed on Mar. 7, 2008.

(51) Int. Cl.
*C09K 5/04* (2006.01)
(52) U.S. Cl.
CPC ............ *C09K 5/044* (2013.01); *C09K 2205/126* (2013.01)
USPC .............................................. 510/408; 252/67
(58) Field of Classification Search
CPC .......................... C09K 5/044; C09K 2205/126
USPC .............................................. 252/67; 510/408
See application file for complete search history.

(56) References Cited

U.S. PATENT DOCUMENTS

| | | | |
|---|---|---|---|
| 5,710,352 A | 1/1998 | Tung | |
| 6,516,837 B2 | 2/2003 | Thomas et al. | |
| 6,962,665 B2 | 11/2005 | Mahler | |
| 6,991,744 B2 | 1/2006 | Mahler et al. | |
| 7,276,177 B2 | 10/2007 | Minor et al. | |
| 7,413,675 B2 | 8/2008 | Minor | |
| 7,708,903 B2 * | 5/2010 | Sievert et al. | 252/68 |
| 7,833,433 B2 | 11/2010 | Singh et al. | |

(Continued)

FOREIGN PATENT DOCUMENTS

| | | |
|---|---|---|
| JP | 7063444 A | 8/1993 |
| WO | WO 98/12161 | 3/1998 |

(Continued)

OTHER PUBLICATIONS

McQuay International "Centrifugal Chiller Fundamentals", Application Guide; AG 31-002 (1996) pp. 2-19.

(Continued)

*Primary Examiner* — Gregory Webb
(74) *Attorney, Agent, or Firm* — Steven D. Boyd

(57) ABSTRACT

This invention relates to the use of chloro-trifluoropropenes as refrigerants in negative-pressure liquid chillers and methods of replacing an existing refrigerant in a chiller with chloro-trifluoropropenes. The chloro-trifluoropropenes, particularly 1-chloro-3,3,3-trifluoropropene, have high efficiency and unexpectedly high capacity in liquid chiller applications and are useful as more environmentally sustainable refrigerants for such applications, including the replacement of R-123 and R-11.

18 Claims, 5 Drawing Sheets

(56) References Cited

U.S. PATENT DOCUMENTS

| | | | |
|---|---|---|---|
| 7,935,268 B2 * | 5/2011 | Basu et al. | 252/67 |
| 8,574,451 B2 | 11/2013 | Hulse et al. | |
| 2005/0263737 A1 | 12/2005 | Minor et al. | |
| 2006/0266976 A1 * | 11/2006 | Minor et al. | 252/68 |
| 2007/0007488 A1 | 1/2007 | Singh et al. | |
| 2007/0187638 A1 | 8/2007 | Guilpain et al. | |
| 2007/0284078 A1 | 12/2007 | Leck et al. | |
| 2007/0284555 A1 | 12/2007 | Leck et al. | |
| 2008/0157022 A1 * | 7/2008 | Singh et al. | 252/68 |
| 2009/0305876 A1 * | 12/2009 | Singh et al. | 502/150 |

FOREIGN PATENT DOCUMENTS

| | | |
|---|---|---|
| WO | WO 2005/067554 | 7/2005 |
| WO | WO 2006/012095 A2 | 2/2006 |
| WO | WO 2007/002625 A2 | 1/2007 |
| WO | WO 2008/006866 A1 | 1/2008 |

OTHER PUBLICATIONS

Bivens, et al., "Alternative Rerigerants for Building Air Conditioning," Proceedings of Tenth Symposium on Improving Building Systems in Hot and Humid Climates Dupont Fluoroproducts, Wilmington DE., (1996) pp. 289-295.

* cited by examiner

USE OF R-1233 IN LIQUID CHILLERS

FIELD OF THE INVENTION

This invention relates to the use of chloro-trifluoropropenes as refrigerants in negative-pressure liquid chillers. The chloro-trifluoropropenes, particularly 1-chloro-3,3,3-trifluoropropene, have high efficiency and unexpectedly high capacity in liquid chiller applications and are useful as more environmentally sustainable refrigerants for such applications, including the replacement of R-123 and R-11. The chloro-trifluoropropenes can be used in new chiller applications or as a top-off or retrofit where the refrigerant is removed from an existing chiller and the chloro-trifluoropropenes of the present invention are added.

BACKGROUND OF THE INVENTION

With continued regulatory pressure there is a growing need to identify more environmentally sustainable replacements for refrigerants, heat transfer fluids, foam blowing agents, solvents, and aerosols with lower ozone depleting and global warming potentials. Chlorofluorocarbon (CFC) and hydrochlorofluorocarbons (HCFC), widely used for these applications, are ozone depleting substances and are being phased out in accordance with guidelines of the Montreal Protocol. Hydrofluorocarbons (HFC) are a leading replacement for CFCs and HCFCs in many applications; though they are deemed "friendly" to the ozone layer they still generally possess high global warming potentials. One new class of compounds that has been identified to replace ozone depleting or high global warming substances are halogenated olefins, such as hydrofluoroolefins (HFO) and hydrochlorofluoroolefins (HCFO). In the present invention, it was discovered that chloro-trifluoropropenes are particularly useful refrigerants liquid chiller systems, particularly in negative-pressure chiller systems, such as for the replacement of R-11 and R-123.

With continued regulatory pressure there is a growing need to identify more environmentally sustainable replacements for refrigerants, heat transfer fluids, foam blowing agents, solvents, and aerosols with lower ozone depleting and global warming potentials. Chlorofluorocarbon (CFC) and hydrochlorofluorocarbons (HCFC), widely used for these applications, are ozone depleting substances and are being phased out in accordance with guidelines of the Montreal Protocol. Hydrofluorocarbons (HFC) are a leading replacement for CFCs and HCFCs in many applications; though they are deemed "friendly" to the ozone layer they still generally possess high global warming potentials. One new class of compounds that has been identified to replace ozone depleting or high global warming substances are halogenated olefins, such as hydrofluoroolefins (HFO) and hydrochlorofluoroolefins (HCFO). The HFOs and HCFOs provide the low global warming potential and zero or near zero ozone depletion properties desired.

Chillers are refrigeration machines that cool water, other heat transfer fluids, or process fluids by a vapor-compression (modified reverse-Rankine), absorption, or other thermodynamic cycle. Their most common use is in central systems to air condition large office, commercial, medical, entertainment, residential high-rise, and similar buildings or clusters of buildings. Both large central and interconnected plants, generally with multiple chillers in each, are common for shopping centers, university, medical, and office campuses; military installations; and district cooling systems. The chilled water (or less commonly a brine or other heat-transfer fluid) is piped through the building or buildings to other devices, such as zoned air handlers, that use the cooled water or brine to air condition (cool and dehumidify) occupied or controlled spaces. By their nature, both efficiency and reliability are critical attributes of chillers. Chillers typically range in thermal capacity from approximately 10 kW (3 ton) to exceeding 30 MW (8,500 ton), with a more common range of 300 kW (85 ton) to 14 MW (4,000 ton). Larger systems typically employ multiple chillers, with some installations exceeding 300 MW (85,000 ton) of cooling. Liquid-chilling systems cool water, brine, or other secondary coolant for air conditioning or refrigeration. The system may be either factory-assembled and wired or shipped in sections for erection in the field. The most frequent application is water chilling for air conditioning, although brine cooling for low temperature refrigeration and chilling fluids in industrial processes are also common.

The basic components of a vapor-compression, liquid-chilling system include a compressor, liquid cooler (evaporator), condenser, compressor drive, liquid-refrigerant expansion or flow control device, and control center; it may also include a receiver, economizer, expansion turbine, and/or subcooler. In addition, auxiliary components may be used, such as a lubricant cooler, lubricant separator, lubricant-return device, purge unit, lubricant pump, refrigerant transfer unit, refrigerant vents, and/or additional control valves.

Liquid (usually water) enters the cooler, where it is chilled by liquid refrigerant evaporating at a lower temperature. The refrigerant vaporizes and is drawn into the compressor, which increases the pressure and temperature of the gas so that it may be condensed at the higher temperature in the condenser. The condenser cooling medium is warmed in the process. The condensed liquid refrigerant then flows back to the evaporator through an expansion device. Some of the liquid refrigerant changes to vapor (flashes) as pressure drops between the condenser and the evaporator. Flashing cools the liquid to the saturated temperature at evaporator pressure. It produces no refrigeration in the cooler. The following modifications (sometimes combined for maximum effect) reduce flash gas and increase the net refrigeration per unit of power consumption.

Subcooling. Condensed refrigerant may be subcooled below its saturated condensing temperature in either the subcooler section of a water-cooled condenser or a separate heat exchanger. Subcooling reduces flashing and increases the refrigeration effect in the chiller.

Economizing. This process can occur either in a direct expansion (DX), an expansion turbine, or a flash system. In a DX system, the main liquid refrigerant is usually cooled in the shell of a shell-and-tube heat exchanger, at condensing pressure, from the saturated condensing temperature to within several degrees of the intermediate saturated temperature. Before cooling, a small portion of the liquid flashes and evaporates in the tube side of the heat exchanger to cool the main liquid flow. Although subcooled, the liquid is still at the condensing pressure.

An expansion turbine extracts rotating energy as a portion of the refrigerant vaporizes. As in the DX system, the remaining liquid is supplied to the cooler at intermediate pressure. In a flash system, the entire liquid flow is expanded to intermediate pressure in a vessel that supplies liquid to the cooler at saturated intermediate pressure; however, the liquid is at intermediate pressure.

Flash gas enters the compressor either at an intermediate stage of a multistage centrifugal compressor, at the intermediate stage of an integral two-stage reciprocating compressor, at an intermediate pressure port of a screw compressor, or at the inlet of a high-pressure stage on a multistage reciprocating or screw compressor.

Liquid Injection. Condensed liquid is throttled to the intermediate pressure and injected into the second-stage suction of the compressor to prevent excessively high discharge temperatures and, in the case of centrifugal machines, to reduce noise. For screw compressors, condensed liquid is injected into a port fixed at slightly below discharge pressure to provide lubricant cooling.

Basic System

An exemplary refrigeration cycle of a basic liquid chiller system is shown in FIG. 1. Chilled water enters the cooler at 54° F., for example, and leaves at 44° F. Condenser water leaves a cooling tower at 85° F., enters the condenser, and returns to the cooling tower near 95° F. Condensers may also be cooled by air or evaporation of water. This system, with a single compressor and one refrigerant circuit with a water-cooled condenser, is used extensively to chill water for air conditioning because it is relatively simple and compact. The compressor can be a reciprocating, scroll, screw, or centrifugal compressor. The preferred systems of the present invention are centrifugal liquid chiller systems.

A centrifugal compressor uses rotating elements to accelerate the refrigerant radially, and typically includes an impeller and diffuser housed in a casing. Centrifugal compressors usually take fluid in at an impeller eye, or central inlet of a circulating impeller, and accelerate it radially outwardly. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. Therefore, in order to maintain the centrifugal compressor performance while replacing the existing refrigerant, the pressure ratio when using the new refrigerant should be as close as possible to that when using the existing refrigerant.

Unlike a positive displacement compressor, a centrifugal compressor depends entirely on the centrifugal force of the high speed impeller to compress the vapor passing through the impeller. There is no positive displacement, but rather what is called dynamic-compression.

The pressure a centrifugal compressor can develop depends on the tip speed of the impeller. Tip speed is the speed of the impeller measured at its tip and is related to the diameter of the impeller and its revolutions per minute. The capacity of the centrifugal compressor is determined by the size of the passages through the impeller. This makes the size of the compressor more dependent on the pressure required than the capacity.

In order to maintain the centrifugal compressor performance while replacing the existing refrigerant, the predetermined impeller Mach number should be the same as that achieved by the existing refrigerant. Since impeller Mach number is dependent upon the acoustic velocity (speed of sound) of refrigerant, the performance of a compressor can more accurately be maintained by formulating a replacement refrigerant which has the same acoustical velocity as the original refrigerant, or which has an acoustical velocity which theoretically will provide the same impeller Mach number as the existing refrigerant.

An important consideration for compressors, especially when replacing an existing refrigerant with a new one, is the dimensionless specific speed, $\Omega$, defined here as:

$$\Omega = \frac{\omega \sqrt{V}}{(\Delta h)^{3/4}}$$

where $\omega$ is the angular velocity (rad/s), V is the volume flow rate (m³/s) and $\Delta h$ is the ideal specific work (J/kg) per compressor stage, which can be approximated as:

$$\Delta h = h_2 - h_1 - (s_2 - s_1)\frac{T_2 - T_1}{\ln(T_2/T_1)}$$

where the subscripts 1 and 2 denotes the gas state at the compressor inlet and outlet respectively. H, s, and T are respectively the specific enthalpy, specific entropy, and temperature. Compressors operate with the highest adiabatic efficiency, $\eta$, when the $\Omega$ has the optimum value for the design.

Because of its high speed operation, a centrifugal compressor is fundamentally a high volume, low pressure machine. A centrifugal compressor works best with a low pressure refrigerant, such as trichlorofluoromethane (CFC-11). When part of the chiller, particularly the evaporator, is operated with at a pressure level below ambient, the chiller is referred to as a negative pressure system. One of the benefits of a low pressure or negative pressure system is low leak rates. Refrigerant leaks are driven by pressure differentials, so lower pressures will result in lower leak rates than high pressure systems. Also, leaks in the system operating at below ambient pressure result in air being sucked into the equipment rather than refrigerant leaking out. While such operation requires a purge device to remove any air and moisture, monitoring the purge operation serves as a warning system for developing leaks.

SUMMARY OF THE INVENTION

In the present invention, it was discovered that chloro-trifluoropropenes are particularly useful refrigerants for liquid chiller systems, particularly in negative-pressure chiller systems, such as for the replacement of R-11 and R-123. The chloro-trifluoropropenes of the present invention were discovered to provide operating conditions comparable to current chiller refrigerants and also to be compatible with current chiller lubricants. The chloro-trifluoropropenes of the present invention are preferably 1-chloro-3,3,3-trifluoropropene and/or 2-chloro-3,3,3-trifluoropropene, and more preferably trans-1-chloro-3,3,3-trifluoropropene.

DETAILED DESCRIPTION OF THE INVENTION

Figure 1:
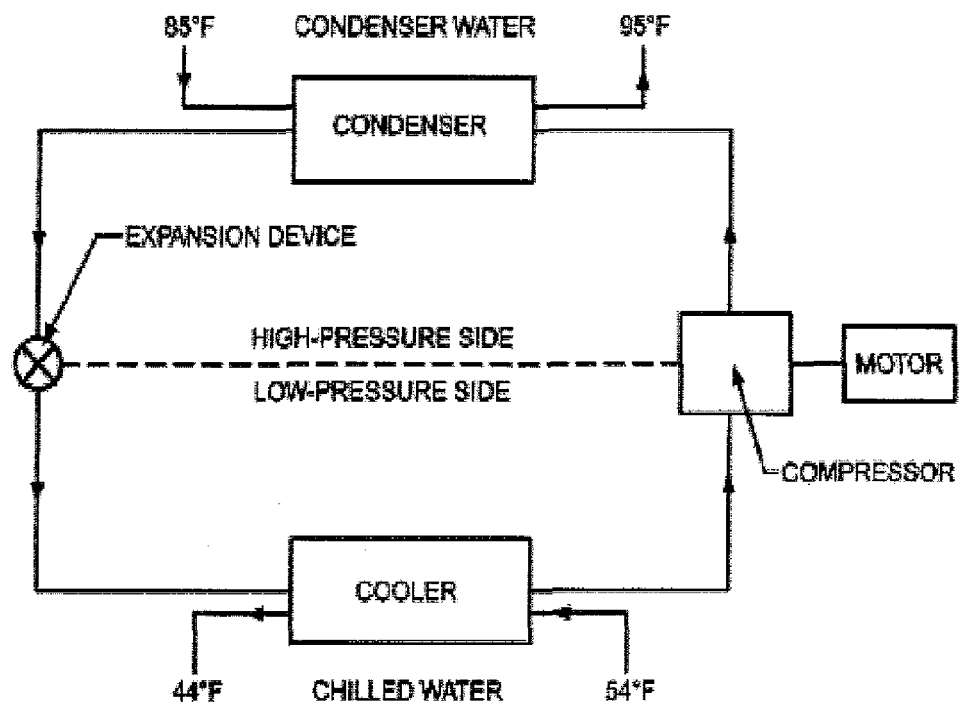
FIG. 1 is a schematic of a typical chiller system.

The chloro-trifluoropropene refrigerant composition of the present invention can be added to a new chiller system or be employed in a method of topping-off or retrofitting an existing chiller system. The chloro-trifluoropropene refrigerant composition of the present invention is particularly useful in chillers, preferably those operated at negative pressure, using centrifugal compressors and flooded evaporators. The retrofit method, comprises the steps of removing the existing refrigerant from the chiller system while optionally retaining a substantial portion of the lubricant in said system; and introducing to said system a composition comprising a chloro-trifluoropropene refrigerant of the present invention which is miscible with the lubricant present in the system without the need for addition surfactants and/or solubilizing agents. In topping-off an existing chiller system, the chloro-trifluoropropene refrigerant of the present invention is added to top-off a refrigerant charge or as a partial replacement either to replace refrigerant lost or after removing part of the existing refrigerant and then adding the chloro-trifluoropropene refrigerant of the present invention. The preferred chloro-trifluoropropene refrigerant of the present invention is preferrably 1-chloro-3,3,3-trifluoropropene and/or 2-chloro-3,3,3-trifluoropropene, and more preferrably trans-1-chloro-3,3,3-trifluoropropene.

As used herein, the term "substantial portion" refers generally to a quantity of lubricant which is at least about 50% (all percentages herein are by weight unless indicated otherwise) of the quantity of lubricant contained in the refrigeration system prior to removal of the prior refrigerant. Preferably, the substantial portion of lubricant in the system according to the present invention is a quantity of at least about 60% of the lubricant contained originally in the refrigeration system, and more preferably a quantity of at least about 70%.

Any of a wide range of known methods can be used to remove prior refrigerants from a chiller system while removing less than a major portion of the lubricant contained in the system. According to preferred embodiments, the lubricant is a hydrocarbon-based lubricant and the removal step results in at least about 90%, and even more preferably at least about 95%, of said lubricant remaining in the system. The removal step may readily be performed by pumping the original refrigerants in the gaseous state out of a refrigeration system containing liquid state lubricants, because refrigerants are quite volatile relative to traditional hydrocarbon-based lubricants. The boiling point of refrigerants are generally under 30° C. whereas the boiling point of mineral oils are generally over 200° C. Such removal can be achieved in any of a number of ways known in the art, including, the use of a refrigerant recovery system. Alternatively, a cooled, evacuated refrigerant container can be attached to the low pressure side of a refrigeration system such that the gaseous prior refrigerant is drawn into the evacuated container and removed. Moreover, a compressor may be attached to a refrigeration system to pump the prior refrigerant from the system to an evacuated container. In light of the above disclosure, those of ordinary skill in the art will be readily able to remove the prior refrigerants from chiller systems and to provide a refrigeration system comprising a chamber having therein a hydrocarbon-based lubricant and a chloro-trifluoropropene refrigerant according to the present invention.

The method of the present invention comprises introducing to a chiller system, a composition comprising at least one chloro-trifluoropropene refrigerant of the present invention miscible with the lubricant present in the system. The lubricants in the chiller system can be hydrocarbon lubricating oils, oxygenated lubrication oils or mixtures thereof In addition to the chloro-trifluoropropene refrigerant of the present invention, the composition introduced into the system can include an additional refrigerant selected from hydrofluorcarbons, hydrochlorofluorocarbons, chlorofluorocarbons, hydrochloroolefins, hydrofluoroethers, fluoroketones, hydrocarbons, ammonia, or mixtures thereof, preferably where the additional refrigerant is non-flammable and/or the resulting refrigerant composition is non-flammable The hydrofluorocarbon can be selected from difluoromethane (HFC-32), 1-fluoroethane (HFC-161), 1,1-difluoroethane (HFC-152a), 1,2-difluoroethane (HFC-152), 1,1,1-trifluoroethane (HFC-143a), 1,1,2-trifluoroethane (HFC-143), 1,1,1,2-tetrafluoroethane (HFC-134a), 1,1,2,2-tetrafluoroethane (HFC-134), pentafluoroethane (HFC-125), 1,1,1,2,3-pentafluoropropane (HFC-245eb), 1,1,1,3,3-pentafluoropropane (HFC-245fa), 1,1,2,2,3-pentafluoropropane (HFC-245ca), 1,1,1,3,3,3-hexafluoropropane (HFC-236fa), 1,1,1,2,3,3,3-heptafluoropropane (HFC-227ea), 1,1,1,3,3-pentafluorbutane (HFC-365mfc), 1,1,1,2,3,4,4,5,5,5-decafluoropropane (HFC-4310) and mixtures thereof.

The hydrochlorofluorocarbon can be selected from 1,1-dichloro-2,2,2-trifluoroethane (R-123), 1-chloro-1,2,2,2-tetrafluoroethane (R-124), 1,1-dichloro-1-fluoroethane (R-141b). 1-chloro-1,1-difluoroethane (R-142b) and mixtures thereof, preferably R-123.

The chlorofluorcarbons can be trichlorofluoromethane (R-11), dichlorodifluoromethane (R-12), 1,1,2-trichloro-1,2,2-trifluoroethane (R-113), 1,2-dichloro-1,1,2,2-tetrafluoroethane (R-114), chloropentafluoroethane (R-115), or mixtures thereof, preferably R-11.

Exemplary hydrofluoroethers include 1,1,1,2,2,3,3-heptafluoro-3-methoxy-propane, 1,1,1,2,2,3,3,4,4-nonafluoro-4-methoxy-butane, or mixtures thereof. An exemplary fluoroketone is 1,1,1,2,2,4,5,5,5-nonafluoro-4(trifluoromethyl)-3-pentanone.

The hydrofluoroolefins can be a C3 to C5 hydrofluoroolefin containing at least one fluorine atom, at least one hydrogen atom and at least one alkene linkage. Exemplary hydrofluoroolefins include 3,3,3-trifluoropropene (HFO-1234zf), E-1,3,3,3-tetrafluoropropene, (E-HFO-1234ze), Z-1,3,3,3-tetrafluoropropene (Z—HFO-1234ze), 2,3,3,3-tetrafluoropropene (HFO-1234yf), E-1,2,3,3,-pentafluoropropene (E-HFO-1255ye), Z-1,2,3,3,3-pentafluoropropene (Z—HFO-125ye), E-1,1,1,3,3,3-hexafluorobut-2-ene (E-HFO-1336mzz), Z-1,1,1,3,3,3-hexafluorobut-2-ene (Z—HFO-1336mzz), 1,1,1,4,4,5,5,5-octafluoropent-2-ene (HFO-1438mzz) or mixtures thereof.

An exemplary hydrochloroolefin is trans-1,2-dichloroethylene.

The hydrocarbons can C3 to C7 alkanes, preferably butanes, pentanes, or mixtures thereof, more preferably n-pentane, isopentane, cyclopentane, or mixtures thereof.

Current chiller lubricants include, but are not limited to, mineral oils, polyol ester oils, polyalklylene glycol oils, polyvinyl ether oils, poly(alphaolefin) oils, alkyl benzene oils and mixtures thereof. Preferred chiller lubricants are mineral oils. The chloro-trifluoropropenes of the present invention were found to be miscible with mineral oils as well as other chiller lubricants.

In addition to the chloro-trifluoropropene refrigerant miscible with the lubricant of the present invention, the composition introduced into the system can include other additives or materials of the type used in refrigerant compositions to enhance their performance in refrigeration systems. For example, the composition can include extreme pressure and antiwear additives, oxidation stability improvers, corrosion inhibitors, viscosity index improvers, pour and floc point depressants, antifoaming agents, viscosity adjusters, UV dyes, tracers, and the like.

The following non-limiting examples are hereby provided as reference:

EXAMPLES

Liquid Chiller Performance Data

The performance of the refrigerants R-123 (1,1-dichloro-2,2,2-trifluoroethane), R-1233zd (1-chloro-3,3,3-trifluoropropene, predominantly trans-isomer), and R-1234yf (2,3,3,3-tetrafluoropropene) in a liquid chiller application were evaluated in the following examples. In each example, data is provided at a given evaporator temperature and at multiple condenser temperatures, ranging from 30° C. to 55° C. The isentropic efficiency in each case was 0.7. Data for R-123 and R-1234yf are provided as comparative examples.

In the following examples, the following nomenclature is used:

Condenser discharge temperature: T cond
Condenser pressure: P cond
Evaporator pressure: P evap
Pressure difference between condenser and evaporator: P diff
Pressure ratio of the condenser to the evaporator: P ratio
Coefficient of Performance (energy efficiency): COP
Capacity: CAP

Example 1

In this example, the following conditions were used:
Evaporator temperature=−10° C. Compressor inlet temperature=−5° C. Isentropic efficiency=0.7. The results are tabulated in Table 1.

Figure 2:
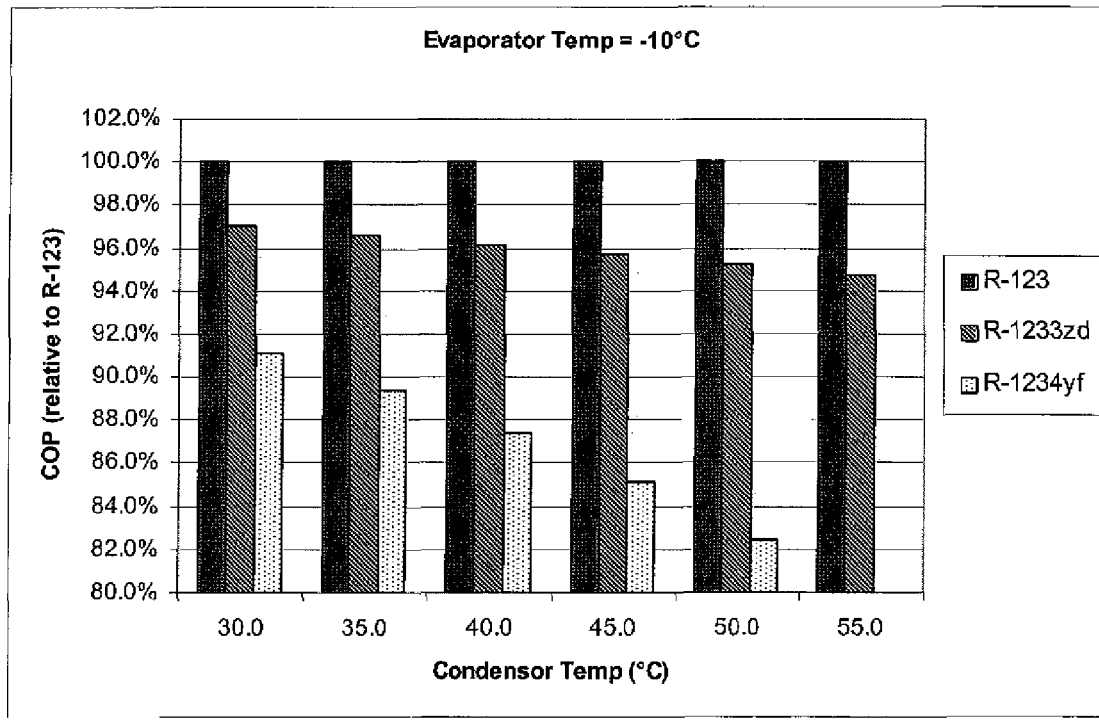
FIG. 2 is a chart of COP for R-123, R-1233zd, and R-1234yf at an evaporator temperature of −10° C.
Figure 3:
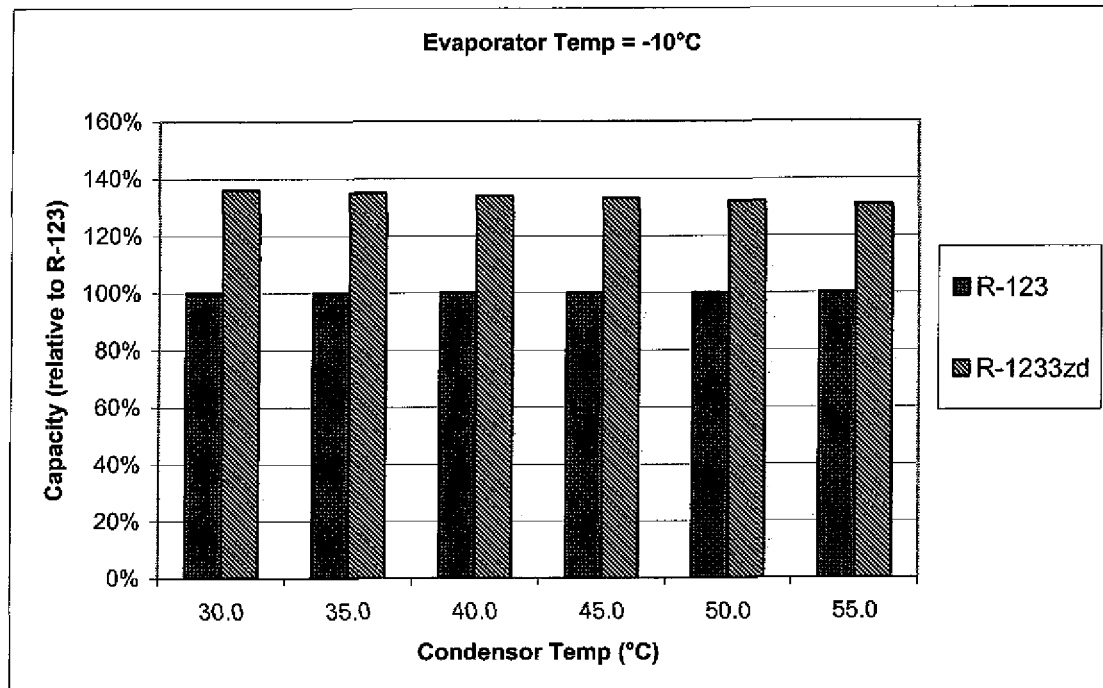
FIG. 3 is a chart of CAP for R-123, R-1233zd, and R-1234yf at an evaporator temperature of −10° C.

FIGS. 2 and 3 show the COP and CAP of R-1233zd and R-1234yf relative to R-123.

TABLE 1

| | T evap −10° C. Internal heat exchanger inlet compressor −5° C. isentropic efficiency 0.7 | | | | | | |
|---|---|---|---|---|---|---|---|
| | Tcond (° C.) | evap P (kPa) | cond P (kPa) | P diff (kPa) | P ratio (p/p) | CAP (KJ/m³) | COP |
| R-1234yf | 30.0 | 219 | 772 | 554 | 3.53 | 1456 | 3.6 |
| | 35.0 | 219 | 882 | 663 | 4.03 | 1372 | 3.1 |
| | 40.0 | 219 | 1003 | 785 | 4.58 | 1287 | 2.7 |
| | 45.0 | 219 | 1137 | 918 | 5.19 | 1200 | 2.3 |
| | 50.0 | 219 | 1283 | 1064 | 5.86 | 1111 | 2.0 |
| | 55.0 | 219 | 1443 | 1224 | 6.59 | 1019 | 1.7 |
| R-1233zd | 30.0 | 28 | 155 | 127 | 5.51 | 280 | 3.9 |
| | 35.0 | 28 | 184 | 156 | 6.54 | 269 | 3.4 |
| | 40.0 | 28 | 217 | 189 | 7.71 | 257 | 2.9 |
| | 45.0 | 28 | 254 | 226 | 9.04 | 245 | 2.6 |
| | 50.0 | 28 | 296 | 268 | 10.52 | 233 | 2.3 |
| | 55.0 | 28 | 343 | 314 | 12.18 | 222 | 2.1 |
| R-123 | 30.0 | 20 | 110 | 90 | 5.44 | 206 | 4.0 |
| | 35.0 | 20 | 131 | 111 | 6.47 | 199 | 3.5 |
| | 40.0 | 20 | 155 | 135 | 7.66 | 192 | 3.1 |

TABLE 1-continued

| | T evap −10° C. Internal heat exchanger inlet compressor −5° C. isentropic efficiency 0.7 | | | | | | |
|---|---|---|---|---|---|---|---|
| | Tcond (° C.) | evap P (kPa) | cond P (kPa) | P diff (kPa) | P ratio (p/p) | CAP (KJ/m³) | COP |
| | 45.0 | 20 | 182 | 162 | 9.00 | 184 | 2.7 |
| | 50.0 | 20 | 213 | 192 | 10.52 | 177 | 2.4 |
| | 55.0 | 20 | 247 | 227 | 12.23 | 169 | 2.2 |

Example 2

In this example, the following conditions were used:
Evaporator temperature=0° C. Compressor inlet temperature=5° C. Isentropic efficiency=0.7. The results are tabulated in Table 2.

Figure 4:
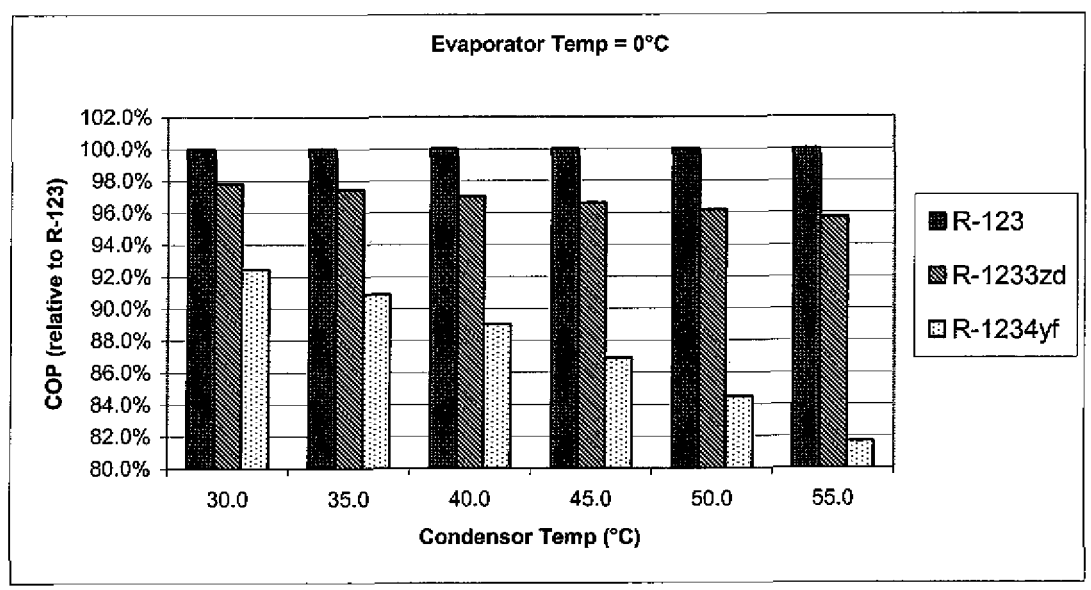
FIG. 4 is a chart of COP for R-123, R-1233zd, and R-1234yf at an evaporator temperature of 0° C.
Figure 5:
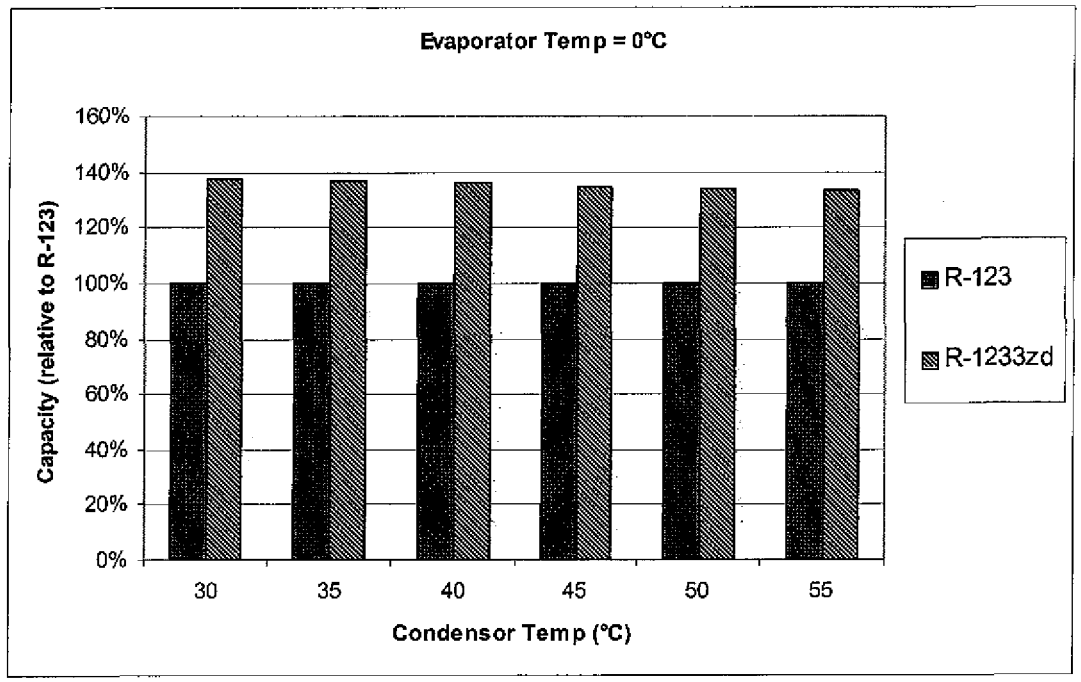
FIG. 5 is a chart of CAP for R-123, R-1233zd, and R-1234yf at an evaporator temperature of 0° C.

FIGS. 4 and 5 show the COP and CAP of R-1233zd and R-1234yf relative to R-123.

TABLE 2

| | T evap 0° C. Internal heat exchanger inlet compressor 5° C. isentropic efficiency 0.7 | | | | | | |
|---|---|---|---|---|---|---|---|
| | Tcond (° C.) | evap P (kPa) | cond P (kPa) | P diff (kPa) | P ratio (p/p) | CAP (KJ/m³) | COP |
| R-1234yf | 30.0 | 312 | 772 | 461 | 2.48 | 2152 | 5.3 |
| | 35.0 | 312 | 882 | 570 | 2.83 | 2035 | 4.4 |
| | 40.0 | 312 | 1003 | 691 | 3.22 | 1915 | 3.7 |
| | 45.0 | 312 | 1137 | 825 | 3.64 | 1793 | 3.1 |
| | 50.0 | 312 | 1283 | 971 | 4.11 | 1668 | 2.7 |
| | 55.0 | 312 | 1443 | 1131 | 4.62 | 1540 | 2.3 |
| R-1233zd | 30.0 | 46 | 155 | 109 | 3.37 | 463 | 5.6 |
| | 35.0 | 46 | 184 | 138 | 4.00 | 444 | 4.7 |
| | 40.0 | 46 | 217 | 171 | 4.72 | 426 | 4.0 |
| | 45.0 | 46 | 254 | 208 | 5.53 | 407 | 3.5 |
| | 50.0 | 46 | 296 | 250 | 6.43 | 389 | 3.0 |
| | 55.0 | 46 | 343 | 297 | 7.45 | 370 | 2.7 |
| R-123 | 30.0 | 33 | 110 | 77 | 3.36 | 337 | 5.7 |
| | 35.0 | 33 | 131 | 98 | 4.00 | 325 | 4.8 |
| | 40.0 | 33 | 155 | 122 | 4.74 | 314 | 4.1 |
| | 45.0 | 33 | 182 | 149 | 5.57 | 302 | 3.6 |
| | 50.0 | 33 | 213 | 180 | 6.51 | 290 | 3.1 |
| | 55.0 | 33 | 247 | 215 | 7.56 | 279 | 2.8 |

Example 3

In this example, the following conditions were used:
Evaporator temperature=5° C. Compressor inlet temperature=10° C. Isentropic efficiency=0.7. The results are tabulated in Table 3.

Figure 6:
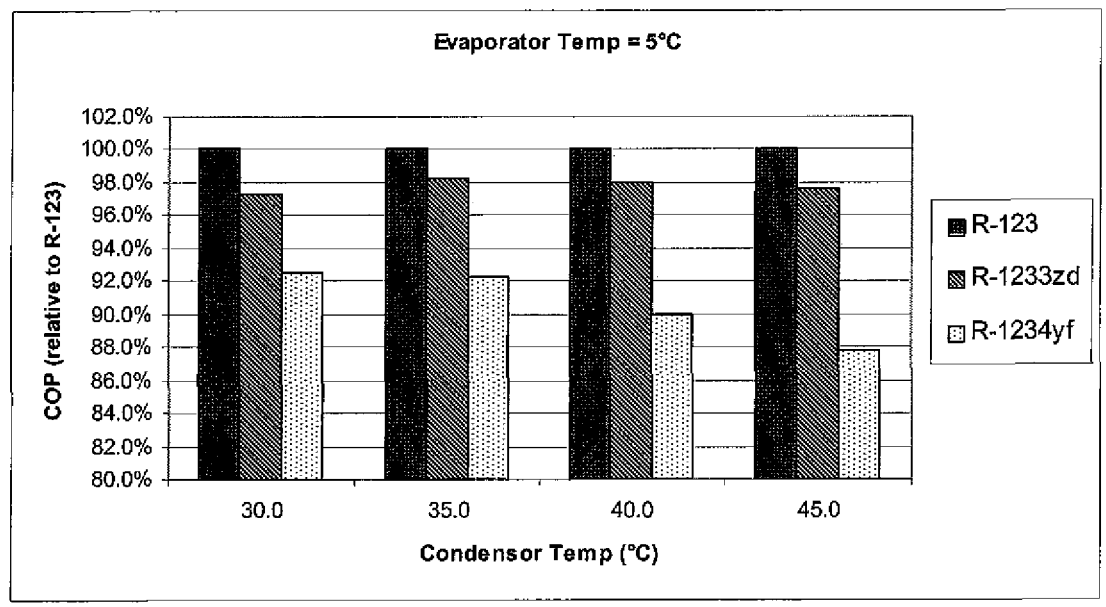
FIG. 6 is a chart of COP for R-123, R-1233zd, and R-1234yf at an evaporator temperature of 5° C.
Figure 7:
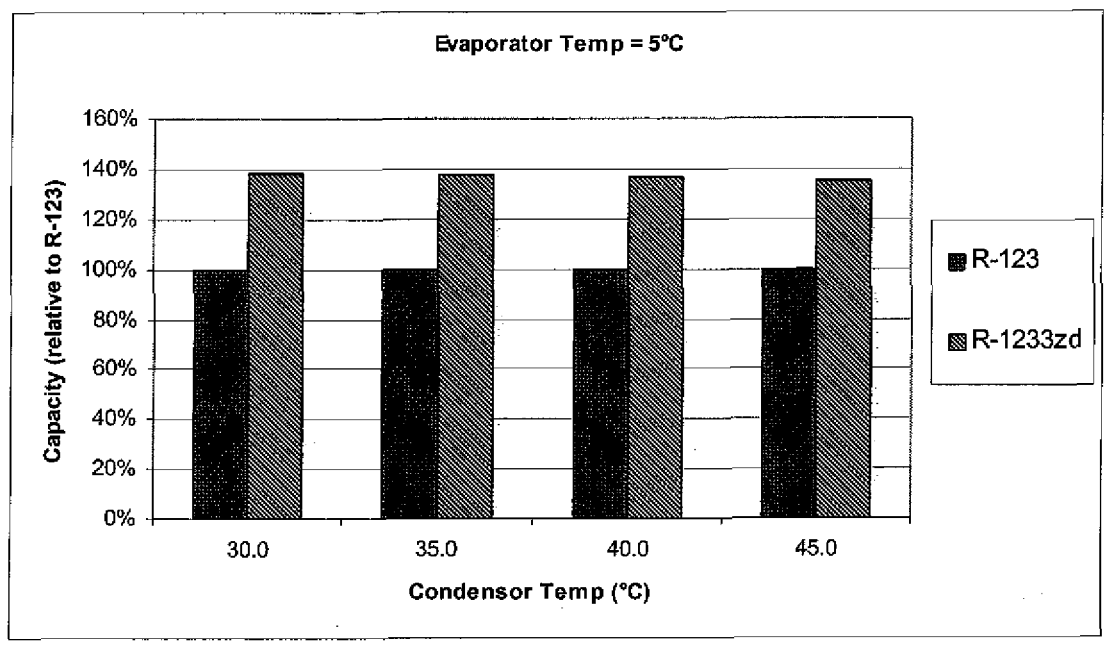
FIG. 7 is a chart of CAP for R-123, R-1233zd, and R-1234yf at an evaporator temperature of 5° C.

FIGS. 6 and 7 show the COP and CAP of R-1233zd and R-1234yf relative to R-123.

TABLE 3

| | T evap 5° C. Internal heat exchanger inlet compressor 10° C. isentropic efficiency 0.7 | | | | | | |
|---|---|---|---|---|---|---|---|
| | Tcond (° C.) | evap P (kPa) | cond P (kPa) | P diff (kPa) | T-out comp | CAP (KJ/m³) | COP |
| R-1234yf | 30.0 | 368 | 772 | 404 | 39 | 2610 | 6.7 |
| | 35.0 | 368 | 882 | 514 | 45 | 2472 | 5.4 |

TABLE 3-continued

T evap 5° C.
Internal heat exchanger
inlet compressor 10° C.
isentropic efficiency 0.7

|  | Tcond (° C.) | evap P (kPa) | cond P (kPa) | P diff (kPa) | T-out comp | CAP (KJ/m$^3$) | COP |
|---|---|---|---|---|---|---|---|
|  | 40.0 | 368 | 1003 | 635 | 51 | 2332 | 4.4 |
|  | 45.0 | 368 | 1136 | 768 | 56 | 2188 | 3.7 |
| R-1233zd | 30.0 | 58 | 154 | 96 | 44 | 585 | 7.0 |
|  | 35.0 | 58 | 183 | 125 | 50 | 562 | 5.7 |
|  | 40.0 | 58 | 216 | 158 | 55 | 539 | 4.8 |
|  | 45.0 | 58 | 254 | 196 | 61 | 516 | 4.1 |
| R-123 | 30.0 | 41 | 110 | 69 | 44 | 423 | 7.2 |
|  | 35.0 | 41 | 131 | 90 | 50 | 409 | 5.8 |
|  | 40.0 | 41 | 155 | 114 | 56 | 395 | 4.9 |
|  | 45.0 | 41 | 182 | 141 | 61 | 381 | 4.2 |

Example 4

In this example, the following conditions were used:

Evaporator temperature=10° C. Compressor inlet temperature=15° C. Isentropic efficiency=0.7. The results are tabulated in Table 4.

Figure 8:
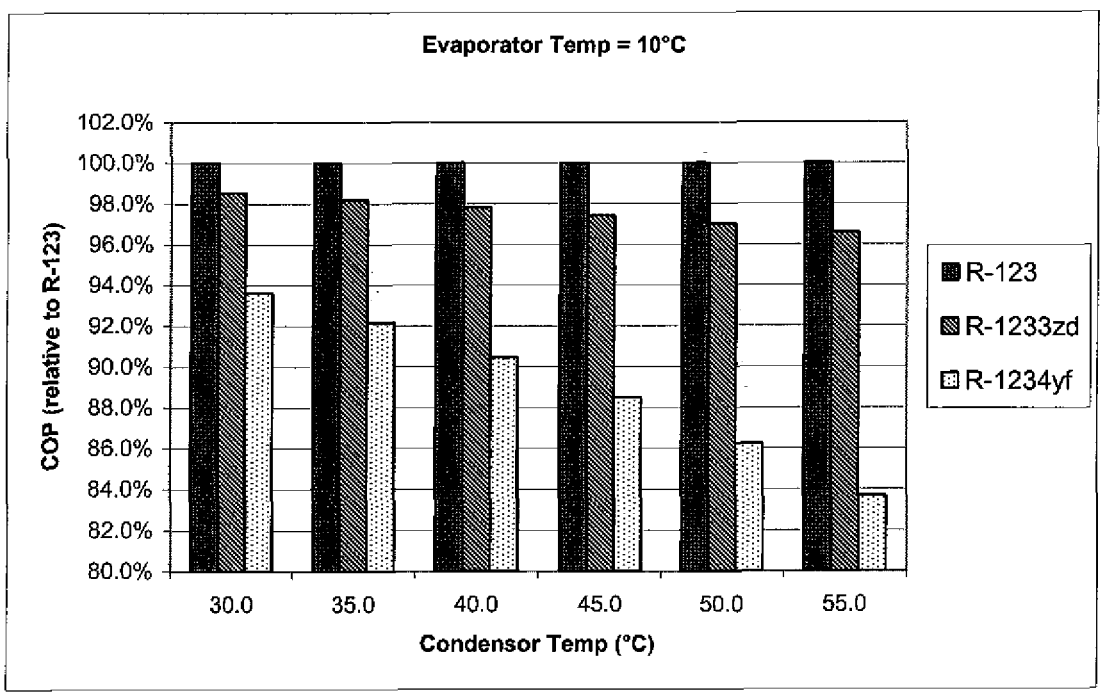
FIG. 8 is a chart of COP for R-123, R-1233zd, and R-1234yf at an evaporator temperature of 10° C.
Figure 9:
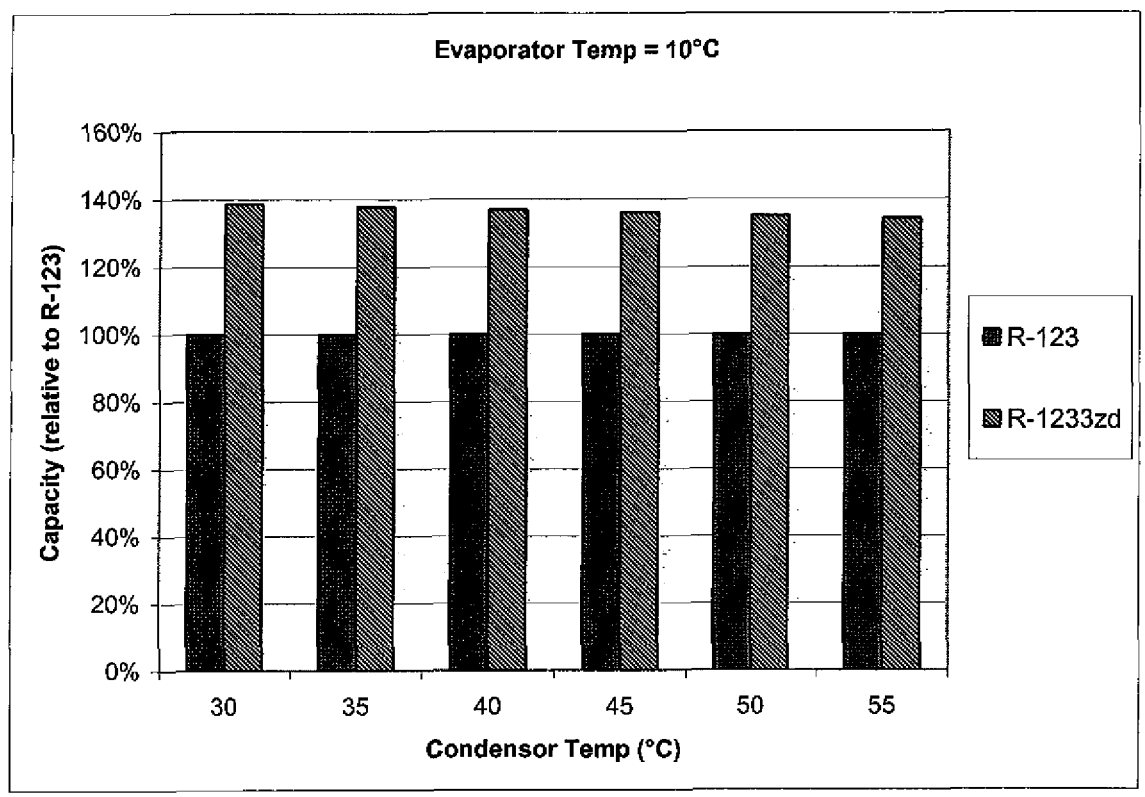
FIG. 9 is a chart of CAP for R-123, R-1233zd, and R-1234yf at an evaporator temperature of 10° C.

FIGS. 8 and 9 show the COP and CAP of R-1233zd and R-1234yf relative to R-123.

TABLE 4

T evap 10° C.
Internal heat exchanger
inlet compressor 15° C.
isentropic efficiency 0.7

|  | Tcond (° C.) | evap P (kPa) | cond P (kPa) | P diff (kPa) | P ratio (p/p) | CAP (KJ/m$^3$) | COP |
|---|---|---|---|---|---|---|---|
| R-1234yf | 30.0 | 432 | 772 | 340 | 1.79 | 3097 | 8.7 |
|  | 35.0 | 432 | 882 | 450 | 2.04 | 2936 | 6.7 |
|  | 40.0 | 432 | 1003 | 571 | 2.32 | 2773 | 5.4 |
|  | 45.0 | 432 | 1137 | 705 | 2.63 | 2606 | 4.4 |
|  | 50.0 | 432 | 1283 | 851 | 2.97 | 2435 | 3.7 |
|  | 55.0 | 432 | 1443 | 1011 | 3.34 | 2258 | 3.1 |
| R-1233zd | 30.0 | 72 | 155 | 83 | 2.16 | 731 | 9.1 |
|  | 35.0 | 72 | 184 | 112 | 2.57 | 703 | 7.1 |
|  | 40.0 | 72 | 217 | 145 | 3.03 | 674 | 5.8 |
|  | 45.0 | 72 | 254 | 182 | 3.55 | 646 | 4.8 |
|  | 50.0 | 72 | 296 | 224 | 4.13 | 618 | 4.1 |
|  | 55.0 | 72 | 343 | 271 | 4.78 | 591 | 3.6 |
| R-123 | 30.0 | 51 | 110 | 59 | 2.17 | 528 | 9.3 |
|  | 35.0 | 51 | 131 | 80 | 2.58 | 510 | 7.3 |
|  | 40.0 | 51 | 155 | 104 | 3.05 | 493 | 5.9 |
|  | 45.0 | 51 | 182 | 131 | 3.59 | 475 | 5.0 |
|  | 50.0 | 51 | 213 | 162 | 4.19 | 458 | 4.3 |
|  | 55.0 | 51 | 247 | 196 | 4.88 | 440 | 3.7 |

Representative data from Tables 1 through 4 is charted in FIGS. 2 through 9.

In all of these examples, the efficiency of R-1233zd was very close to that of R-123, being within a few percent of the efficiency of R-123. In contrast, the efficiency of R-1234yf was significantly lower than that of R-1233zd and R-123, being from 6.4% lower to over 20% lower than that of R-123. It was also unexpectedly discovered that the capacity of R-1233zd was from 30% to 40% greater than that of R-123.

It is also shown that for R-1233zd and for R-123 the system is operated as a negative-pressure system, where the pressure in the evaporator is below ambient. For R-1234yf the entire system is operated at positive-pressure.

R-1233zd was found to provide a close match to operating pressures, pressure ratio, and pressure difference of R-123 and can be used as a more environmentally acceptable replacement.

Example 5

Acoustic Velocity

The acoustic velocity for R-11, R-123, R-134a, R-1233zd and R-1234yf were determined at 40° C. and 1 bar. The acoustic velocity of R-1233zd is close to that of R-11 and closer to that of R-123 than either R-134a or R-1234yf.

TABLE 5

Acoustic Velocity of Refrigerants
Conditions: 40° C. and 1 bar.

| Refrigerant | Acoustic Velocity (m/s) |
|---|---|
| R123 | 131.9 |
| R-11 | 142.0 |
| R-1233zd | 143.7 |
| R-1234yf | 155.6 |
| R-134a | 165.7 |

Example 6

Dimensionless Specific Speed

The performance of R-123, R-1233zd, and R-1234yf in a liquid chiller was determined as in example 2, with a compressor inlet temperature at 5° C. and a condenser temperature at 40° C. The results are shown in Table 6, which also gives the ratio of the dimensionless specific speed, $\Omega$, of the refrigerant to that of R-123 ($\Omega_{123}$), assuming the chillers are operated to deliver the same capacity of cooling. R-1233zd was found to be a good replacement for R-123 as compared to R-1234yf.

TABLE 6

Dimensionless Specific Speed of
Refrigerants at Equivalent Cooling Capacity
Evaporator Temp: 5° C. Condenser Temp: 40° C.

| Refrigerant | Compressor | P (bar) | Temp (° C.) | $\Omega/\Omega_{123}$ |
|---|---|---|---|---|
| R123 | inlet | 0.33 | 5 | 1 |
|  | outlet | 1.55 | 58 |  |
| R-1233zd | inlet | 0.46 | 5 | 0.76 |
|  | outlet | 2.17 | 58 |  |
| R-1234yf | inlet | 3.12 | 5 | 0.44 |
|  | outlet | 10.03 | 52 |  |

These results show that R-1233, particularly R-1233zd is useful as a refrigerant for liquid chillers, particularly negative-pressure chillers, and especially in large systems due to the efficiency benefits of R-1233zd over R-1234yf or similar refrigerants.

The invention claimed is:

1. A process for producing refrigeration in a chiller system comprising compressing a hydrochlorofluoropropene refrigerant in a centrifugal compressor wherein the evaporator pressure is less than ambient pressure, and evaporating the hydrochlorofluoropropene refrigerant in the vicinity of a body to be cooled, wherein said hydrochlorofluoropropene refrigerant consists essentially of a chloro-trifluoropropene selected from the group consisting of 1-chloro-3,3,3-trifluoropropene, 2-chloro-3,3,3-trifluoropropene and mixtures thereof.

2. The process of claim 1 wherein said hydrochlorofluoropropene refrigerant further comprises a co-refrigerant selected from the group consisting of a hydrofluorocarbon, a hydrofluoroolefin, a hydrochlorofluorocarbon, a chlorofluorocarbon, a hydrochloroolefin, a fluoroketone, hydrofluoroether, hydrocarbon, ammonia, or mixtures thereof.

3. The process of claim 2 wherein said chlorofluorocarbon is selected from the group consisting of trichlorofluoromethane (R-11), dichlorodifluoromethane (R-12), 1,1,2-trichloro-1,2,2-trifluoroethane (R-113), 1,2-dichloro-1,1,2,2-tetrafluoroethane (R-114), chloropentafluoroethane (R-115) and mixtures thereof.

4. The process of claim 2 wherein said chlorofluorocarbon is trichlorofluoromethane (R-11).

5. The process of claim 2 wherein said hydrochlorofluorocarbon is selected from the group consisting of 1,1-dichloro-2,2,2-trifluoroethane (R-123), 1-chloro-1,2,2,2-tetrafluoroethane (R-124), 1,1-dichloro-1-fluoroethane (R-141b). 1-chloro-1,1-difluoroethane (R-142b) and mixtures thereof.

6. The process of claim 2 wherein said hydrochlorofluorocarbon is 1,1-dichloro-2,2,2-trifluoroethane (R-123).

7. The process of claim 2 wherein said hydrofluorocarbon is selected from the group consisting of difluoromethane (HFC-32), 1-fluoroethane (HFC-161), 1,1-difluoroethane (HFC-152a), 1,2-difluoroethane (HFC-152), 1,1,1-trifluoroethane (HFC-143a), 1,1,2-trifluoroethane (HFC-143), 1,1,1,2-tetrafluoroethane (HFC-125), 1,1,1,2,3-pentafluoropropane, (HFC-245eb), 1,1,1,3,3-pentafluoropropane (HFC-245fa), 1,1,2,2,3-pentafluoropropane (HFC-245ca), 1,1,1,3,3,3-hexafluoropropane (HFC-236fa), 1,1,1,2,3,3,3-heptafluoropropane (HFC-227ea), 1,1,1,3,3-pentafluorbutane (HFC-365mfc), 1,1,1,2,3,4,4,5,5,5-decafluoropropane (HFC-4310) and mixtures thereof.

8. The process of claim 2 wherein said hydrofluorocarbon is selected from the group consisting of 1,1,1,2,3-pentafluoropropane, (HFC-245eb), 1,1,1,3,3-pentafluoropropane (HFC-245fa), 1,1,2,2,3-pentafluoropropane (HFC-245ca), 1,1,1,3,3-pentafluorbutane (HFC-365mfc), 1,1,1,2,3,4,4,5,5,5-decafluoropropane (HFC-4310) and mixtures thereof.

9. The process of claim 2 wherein said hydrofluorocarbon is 1,1,1,3,3-pentafluoropropane (HFC-245fa).

10. The process of claim 2 wherein said hydrofluoroolefin is a C3 to C5 hydrofluoroolefin containing at least one fluorine atom, at least one hydrogen atom and at least one alkene linkage.

11. The process of claim 2 wherein said hydrofluoroolefin is selected from the group consisting of 3,3,3-trifluoropropene (HFO-1234zf), E-1,3,3,3-tetrafluoropropene, (E-HFO-1234ze), Z-1,3,3,3-tetrafluoropropene (Z-HFO-1234ze), 2,3,3,3-tetrafluoropropene (HFO-1234yf), E-1,2,3,3,-pentafluoropropene (E-HFO-1255ye), Z-1,2,3,3,3-pentafluoropropene (Z-HFO-1225ye), E-1,1,1,3,3,3-hexafluorobut-2-ene (E-HFO-1336m/z), Z-1,1,1,3,3,3-hexafluorobut-2-ene (Z-HFO-1336m/z), 1,1,1,4,4,5,5,5-octafluoropent-2-ene (HFO-1438m/z) and mixtures thereof.

12. The process of claim 2 wherein said hydrofluoroolefin is selected from the group consisting of E-1,1,1,3,3,3-hexafluorobut-2-ene (E-HFO-1336m/z), Z-1,1,1,3,3,3-hexafluorobut-2-ene (Z-HFO-1336m/z) and mixtures thereof.

13. The process of claim 2 wherein said hydrochloroolefin is trans-1,2-dichloroethylene.

14. The process of claim 2 wherein said hydrofluoroether is 1,1,1,2,2,3,3-heptafluoro-3-methoxy-propane, 1,1,1,2,2,3,3,4,4,-nonafluoro-4-methoxy-butane and mixtures thereof.

15. The process of claim 2 wherein said fluoroketone is 1,1,1,2,2,4,5,5,5-nonafluoro-4(trifluoromethyl)-3-pentanone.

16. The process of claim 2 wherein said hydrocarbon is a C3 through C7 saturated alkane.

17. The process of claim 2 wherein said hydrocarbon is n-pentane, isopentane, cyclopentane and mixtures thereof.

18. The process of claim 2 further comprising a lubricant wherein said lubricant is selected from the group consisting of mineral oils, polyol ester oils, polyalkylene glycol oils, polyvinyl ether oils, poly(alphaolefin) oils, alkyl benzene oils and mixtures thereof.

* * * * *